(12) United States Patent
Oicles et al.

(10) Patent No.: US 7,209,373 B2
(45) Date of Patent: Apr. 24, 2007

(54) HIGH VOLTAGE PULSE GENERATOR

(75) Inventors: Jeffrey Alan Oicles, San Diego, CA (US); David M. Johns, Groveland, MA (US)

(73) Assignee: Kaiser Systems, Inc., Beverly, MA (US)

( * ) Notice: Subject to any disclaimer, the term of this patent is extended or adjusted under 35 U.S.C. 154(b) by 25 days.

(21) Appl. No.: 11/023,851

(22) Filed: Dec. 28, 2004

(65) Prior Publication Data

US 2006/0139977 A1    Jun. 29, 2006

(51) Int. Cl.
H02M 7/00 (2006.01)
H03K 3/00 (2006.01)

(52) U.S. Cl. .......................... 363/59; 307/108

(58) Field of Classification Search ................ 363/59, 363/60, 61, 65; 307/106, 108, 110
See application file for complete search history.

(56) References Cited

U.S. PATENT DOCUMENTS

| | | | | |
|---|---|---|---|---|
| 4,274,134 A | * | 6/1981 | Johannessen | 363/59 |
| 4,900,947 A | * | 2/1990 | Weiner et al. | 307/110 |
| 5,105,097 A | * | 4/1992 | Rothe | 307/108 |

OTHER PUBLICATIONS

R.A. Fitch and V.T.S Howell, Novel Principle of Transient High-Voltage Generation, Proceedings of the Institution of Electrical Engineers, Science and General, Apr. 1964, pp. 849-855, vol. 111, No. 4, The Institution of Electrical Engineers, UK.

R.A. Fitch, Marx—and Marx-Like—High-Voltage Generators, Transactions on Nuclear Science, Aug. 1971, pp. 190-198, vol. N5-18, No. 4, Institute of Electrical and Electronic Engineers, New York.

M. Rivaletto, P. Domens and P. Pignolet, An Asymmetrical 175 kV, 210 ns Pichugin Pulse Generator, Oct. 1998, vol. 9, No. 10, Measurement, Science and Technology, Oct. 1998, pp. 1765-1771, vol. 9, No. 10, Institute of Physics, UK.

* cited by examiner

Primary Examiner—Adolf Berhane
(74) Attorney, Agent, or Firm—Philip O. Post

(57) ABSTRACT

A high voltage pulse generator utilizes an even number of Marx cells using L-C inversion topology. Each Marx cell is associated with an individual inverter transformer having a primary winding connected to the output of an ac power supply such as a series resonant inverter. The secondary of each inverter transformer is half-wave rectified to charge the energy storage capacitors in each Marx cell. A distributed voltage sensing scheme can be provided for accurate feedback to the inverter's controller. An inductive element can be used to achieve a magnetic diode effect in the L-C inversion circuit to reduce component stress and improve efficiency. A transformer-coupled floating gate drive circuit is used to provide local power conditioning and trigger timing for discharge of the energy storage capacitors.

22 Claims, 14 Drawing Sheets

HIGH VOLTAGE PULSE GENERATOR

CROSS REFERENCE TO RELATED APPLICATIONS

Not applicable.

FIELD OF THE INVENTION

The present invention relates to high voltage pulse generators for use with pulsed loads in applications such as excimer lasers.

BACKGROUND OF THE INVENTION

Various electrical devices, such as excimer lasers, require a fast rise, high voltage, high current electrical discharge of an energy pulse for their operation. Such a pulse is applied to the laser cavity in a manner that atomically excites the laser gas to metastable quantum states. By proper laser design, these states collapse in unison to produce the desired optical output pulse.

The generation of the energy pulse has been accomplished by using at least two power electronics modules, namely: (1) a high voltage power supply (HVPS) that provides a current-controlled output used to charge external energy storage capacitors over a relatively long period of time; and (2) a power modulator that draws upon the energy storage capacitors to develop a very fast, high power electrical pulse. There are several variations on this general arrangement, but all have a separate HVPS, or capacitor charger supply, that is separated from the power modulator. A high voltage cable provides the interconnect between the HVPS and modulator. Therefore one object of the present invention is to provide an integrated HVPS and power modulator that does not require high voltage cabling between the HVPS and power modulator.

Classical modulators are generally thyratron driven, but, in rare cases, might use gas-filled spark gap switches as well. Over the past several years, all-solid-state approaches based on magnetic pulse compression have emerged, but have generally been restricted to high end applications because of cost and a pervasive belief that such designs are difficult to realize. Another object of the present invention is to provide a cost efficient all-solid-state power modulator for use in an integrated HVPS and power modulator that does not require high voltage cabling between the HVPS and power modulator. These and other objects of the invention are further set forth in this specification.

BRIEF SUMMARY OF THE INVENTION

The present invention is apparatus for, and method of, generating a high voltage pulse. The pulse generator includes an even number of capacitor charging circuits, each comprising an LC inversion Marx generator with two or more capacitors and a switch to control the discharge of the capacitors. A cell inverter transformer is provided for each charging circuit. The primary winding of each cell inverter transformer is connected to the ac output of a power supply such as a series-resonant inverter. The secondary winding of each cell inverter transformer is connected via rectifying means to the charging circuit to charge the capacitors. One-half of the cell inverter transformers have their primary windings connected to the ac output of the power supply in inverted phase to that of the remaining cell inverter transformers.

A feedback circuit may be included for sensing the voltage across each of the capacitors in the LC inversion Marx generator and providing a signal proportional to the sensed voltage across each of the capacitors to the power supply. The even number of capacitor charging circuits may be divided into two or more arrays, with each array comprising an equal number of capacitor charging circuits, so that the summed voltages across each of the capacitors in each array can be sensed to provide a signal to the power supply that is proportional to the summed voltages.

A pulse generating circuit may be provided for generating a train of periodic normal pulses except when a trigger event causes the pulse generating circuit to generate a trigger pulse. A pulse processing circuit may be provided for receiving the period normal pulses and trigger pulses to generate an output signal when a trigger pulse occurs. The output signal closes the switch in each LC inversion Marx generator to discharge its stored energy for generation of a high voltage pulse.

The even number of capacitor charging circuits may be connected in series to form a stack of capacitor charging circuits that may be directly connected to a power modulator for transfer of the generated high voltage pulse to a pulsed load.

These and other aspects of the invention are set forth in the specification.

BRIEF DESCRIPTION OF THE DRAWINGS

The figures, in conjunction with the specification and claims, illustrate one or more non-limiting modes of practicing the invention. The invention is not limited to the illustrated layout and content of the drawings.

DETAILED DESCRIPTION OF THE INVENTION

Figure 1A:
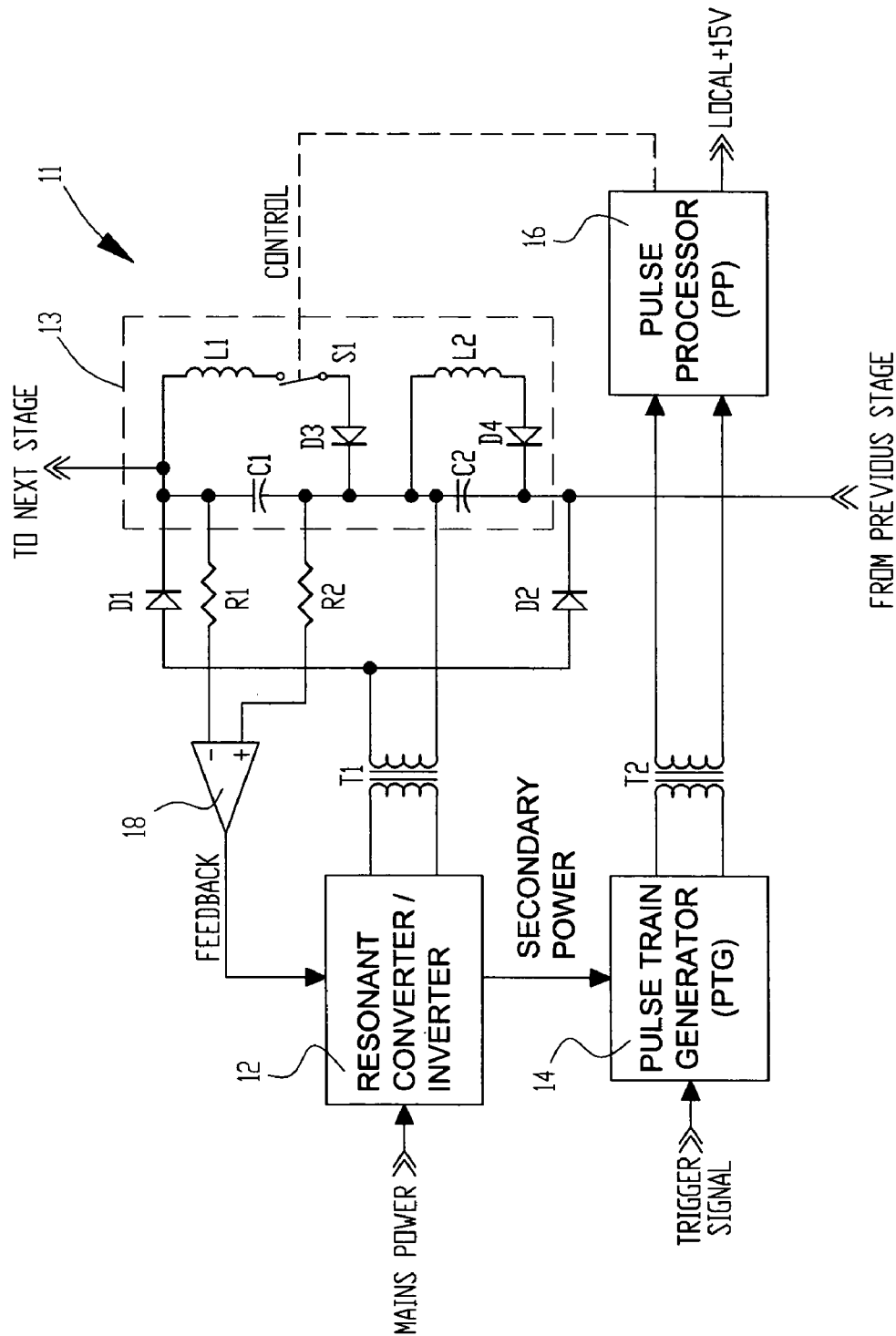
FIG. 1(a) is a simplified block and schematic diagram of one example of a single-stage pulse forming network used in the high voltage pulse generator of the present invention.

Referring now to the drawings, wherein like numerals indicate like elements, there is shown in the figures one example of the high voltage pulse generator of the present invention. The capacitor charging circuit of the pulse generator utilizes multiple charging cells or stages, each of which uses a Marx generator wherein two or more capacitors are charged in parallel and discharged in series. The utilized Marx generator is specifically of the type known as an "LC inversion Marx generator" or "LC vector inversion circuit." As illustrated in FIG. 1(a) a typical single cell (or stage) of charging circuit 11 utilizes a Marx cell 13 comprising capacitors C1 and C2, inductors L1 and L2, diodes D3 and D4, and switch S1. Inductor L1 is in parallel with capacitor C1, with diode D3 and switch S1 inserted between the inductor and capacitor as shown in FIG. 1(a); inductor L2 is in parallel with capacitor C2, with diode D4 inserted between the inductor and capacitor as shown in FIG. 1(a). An even number of multiple cells are connected together to provide the required output voltage for the pulse generator. In each cell, energy storage capacitors C1 and C2 are initially charged to identical voltages, but opposite in polarity, so that, since they are connected in series, the net output voltage across a cell (i.e., voltage across terminations designated "FROM PREVIOUS STAGE" to "TO NEXT STAGE" in FIG. 1(a)) is essentially zero.

Figure 2A:
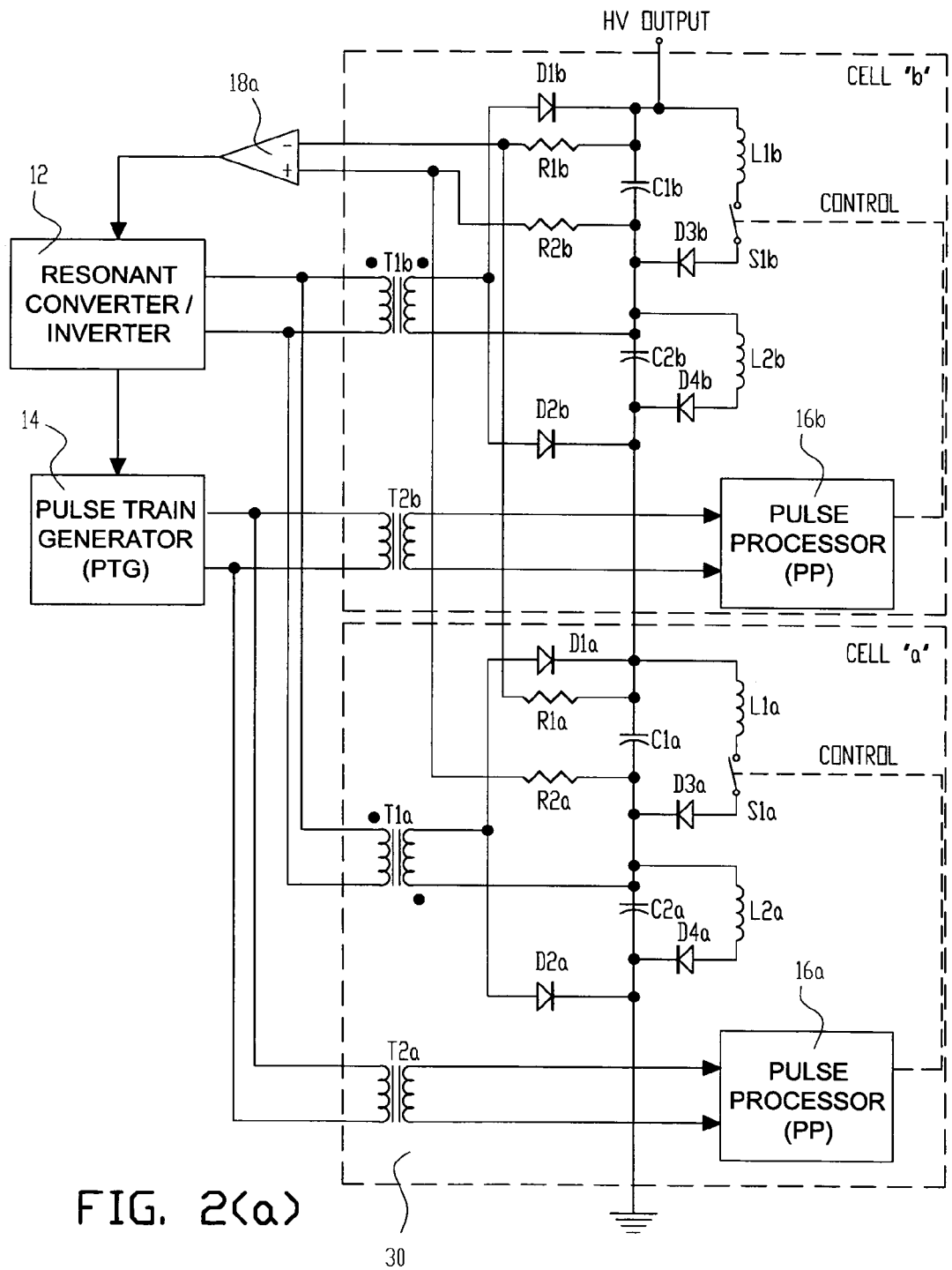
FIG. 2(a) is a simplified block and schematic diagram of one example of a two-stage pulse forming network used in the high voltage pulse generator of the present invention.
Figure 3A:
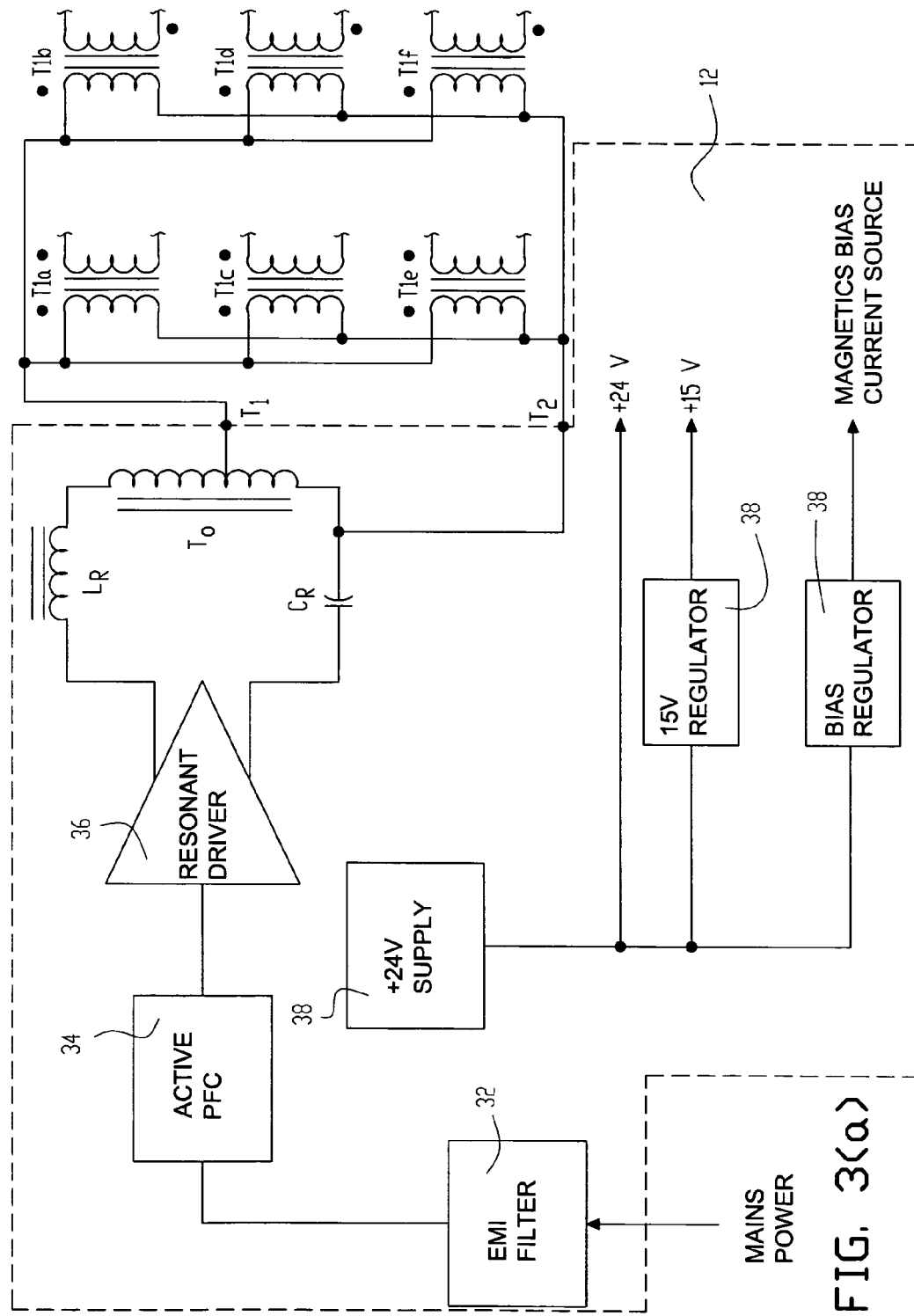
FIG. 3(a) is a simplified block and schematic diagram of one example of an inverter and cell inverter transformers used with the pulse forming networks in the high voltage pulse generator of the present invention.

A suitable ac power supply, such as series resonant inverter 12, coupled through cell inverter transformer T1, provides capacitor charging. As known in the art, the inverter includes a rectifier section that converts ac power (designated "MAINS POWER" in FIG. 1(a)) into dc, which in turn, is transformed into high frequency ac by the inverter. Each stage has a cell inverter transformer as illustrated in FIG. 2(a) for a two-stage charging circuit (transformers T1a and T1b). Each of the cell inverter transformers has a primary winding connected to the ac output of series resonant inverter 12 and a secondary winding connected across the capacitors in each cell via rectifier means (diodes D1 and D2) that converts the ac power into dc power. Preferably the cell inverter transformer and the rectification circuit connected to the transformer's secondary winding are collocated with the capacitor charging circuit. For example in FIG. 2(a), cell inverter transformer T1a and diodes D1a and D2a may be collated with cell charging capacitors C1a and C2a on cell "a" circuit board 30. FIG. 3(a) is a more detailed typical arrangement of the cell inverter transformers for one example of a high power pulse generator of the present invention. Series resonant inverter 12 receives suitable ac input power ("MAINS POWER" in FIG. 3). EMI FILTER 32 filters the ac input power while ACTIVE PFC 34 provides active power factor correction of the ac input power as known in the art. RESONANT DRIVER 36 outputs high frequency ac through inductor $L_R$ and capacitor $C_R$, which serve as the prime resonating elements for the series-resonant inverter topology. Autotransformer $T_o$ provides inverter output power at the appropriate voltage level for the cell inverter transformers T1a through T1f. As illustrated in FIG. 3(a), there are an even number of cell inverter transformers, namely six in this example, each of which charges the capacitors in one of six cells. The primary winding of each cell inverter transformer is connected to the output of inverter 12 ($T_1$ and $T_2$) and the secondary windings of the six cell inverter transformers are wound so that the phasing of the inverter's output at the secondary windings is inverted for half of the cell inverter transformers relative to the phasing of the output at the secondary windings for the other half of the cell inverter transformers. As illustrated in FIG. 1(a) and FIG. 2(a), the secondary winding of each cell inverter transformer is half-wave rectified, for example, by diodes D1 and D2 in FIG. 1(a), which provide a means for rectifying the output of the secondary winding. Consequently each cell presents essentially an open circuit to the inverter on one-half cycle of operation. Inverting the phasing of the inverter's output to capacitors in half of the cells (via the cell inverter transformers) balances the load on the inverter so that each inverter cycle is treated equally. In this manner half of the cells are charged on one inverter half cycle, and the remainder on the other half cycle.

Figure 2B:
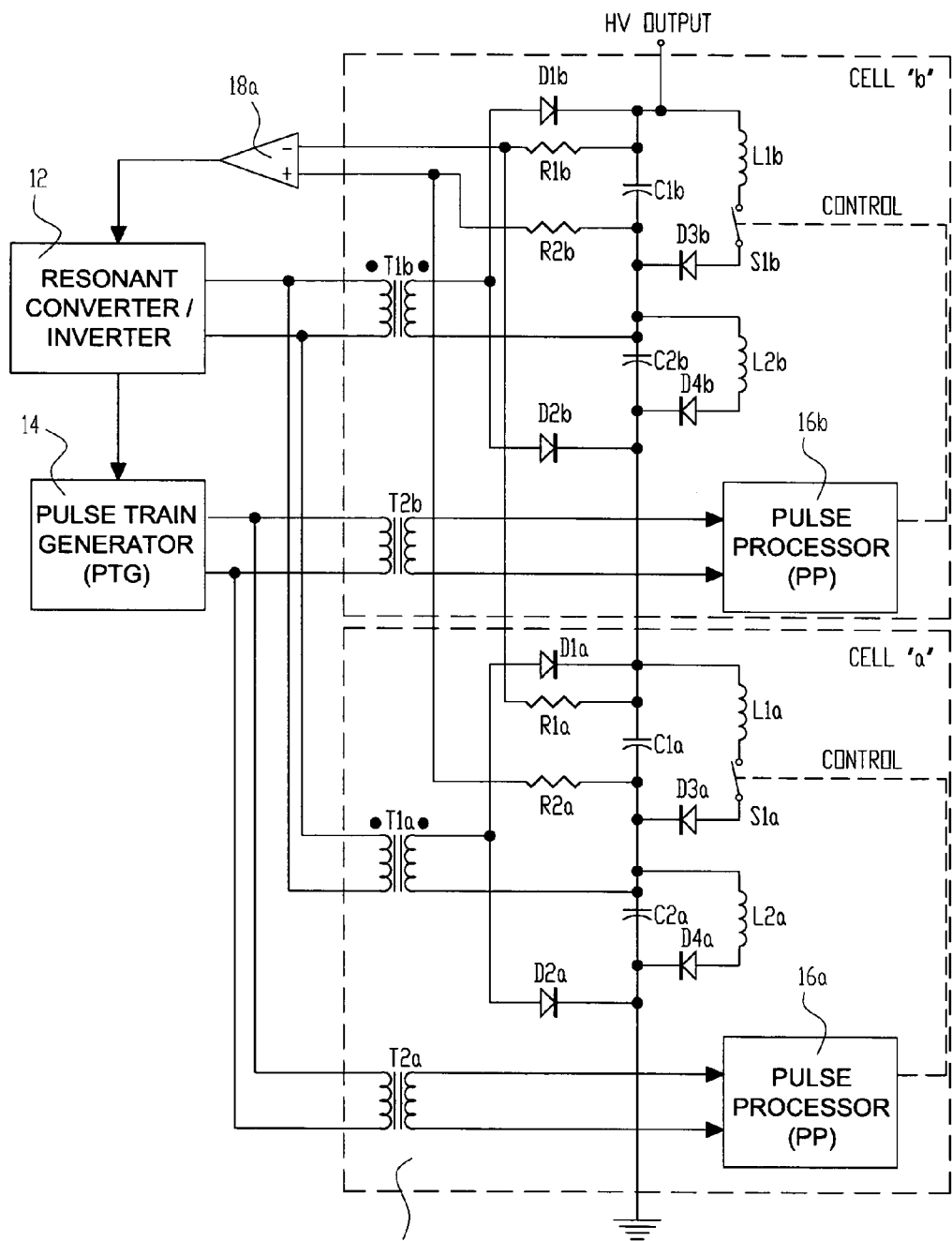
FIG. 2(b) is a simplified block and schematic diagram of another example of a two-stage pulse forming network used in the high voltage pulse generator of the present invention.
Figure 2C:
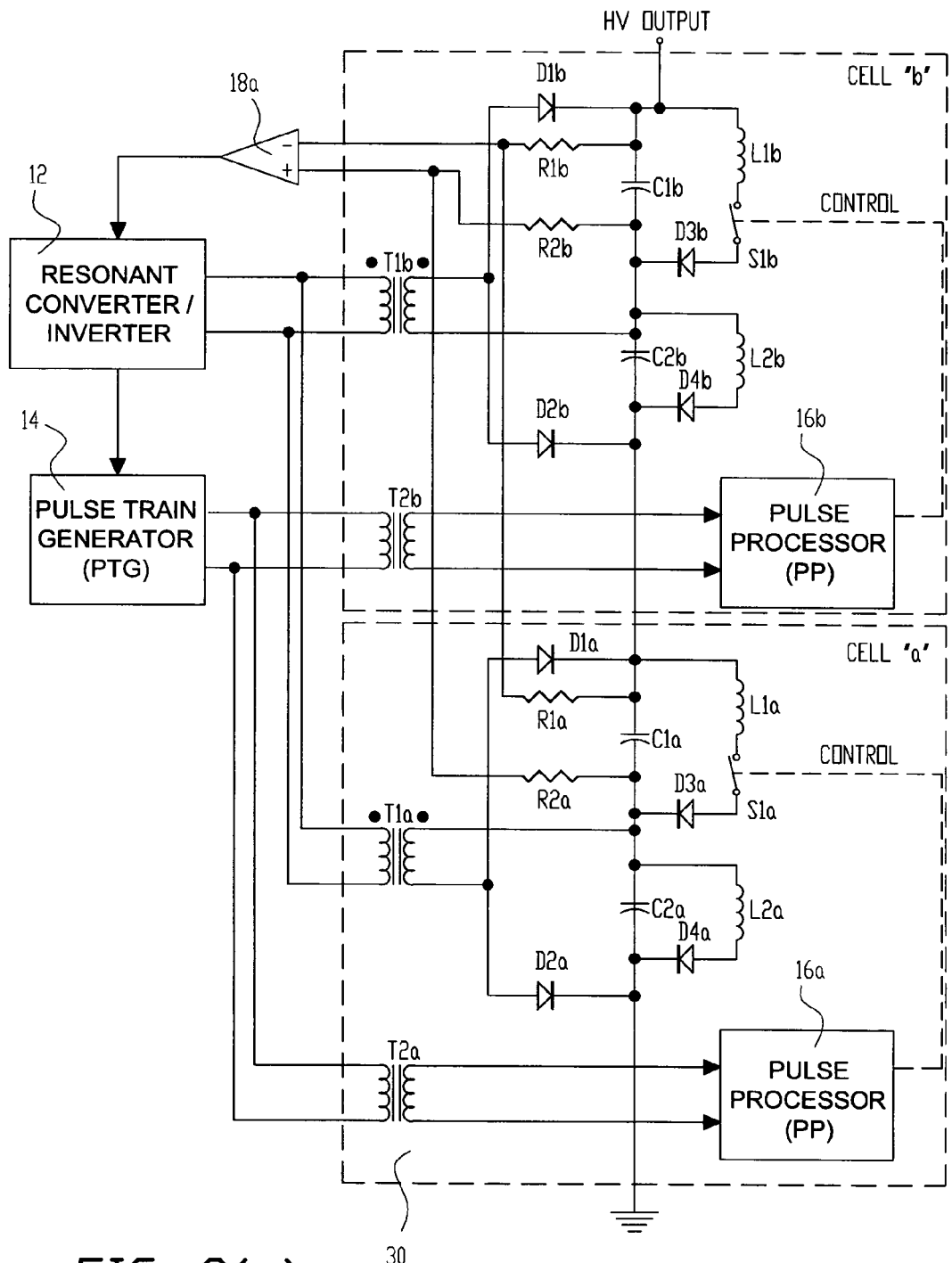
FIG. 2(c) is a simplified block and schematic diagram of another example of a two-stage pulse forming network used in the high voltage pulse generator of the present invention.
Figure 2D:
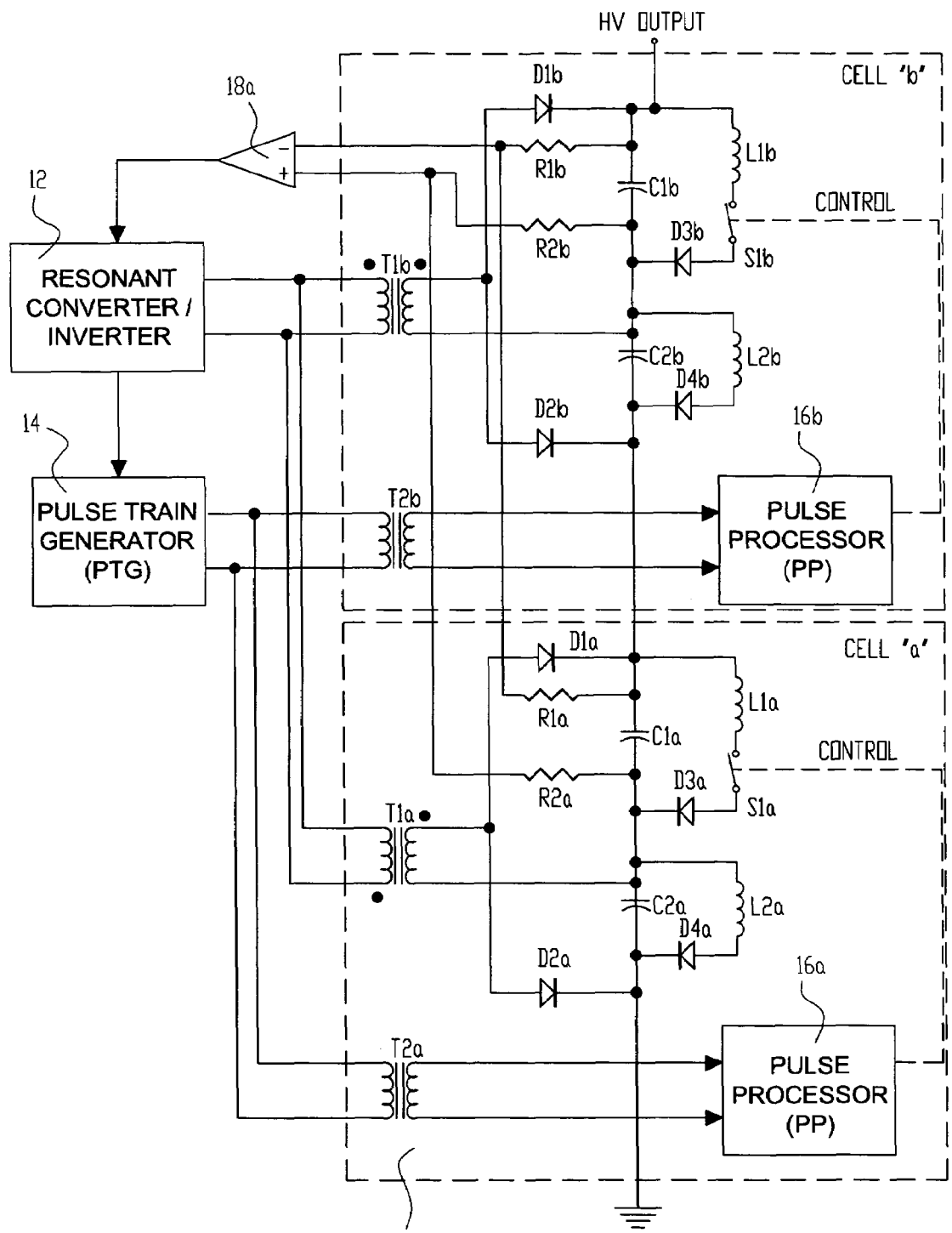
FIG. 2(d) is a simplified block and schematic diagram of another example of a two-stage pulse forming network used in the high voltage pulse generator of the present invention.

FIG. 2(a) illustrates one method of providing an inverted phase output to the capacitors in half of the cells. Namely in FIG. 2(a) winding of the secondary windings of the cell inverter transformers is accomplished in a manner to provide an inverted phase output to the capacitors in half of the cells as illustrated by the dot convention in the figure. In alternate examples of the invention the means for providing an inverted phase output to half of the transformers may be accomplished in other ways. For example, in FIG. 2(b), both cell inverter transformers have the same phasing, and phase inversion to the capacitors in half of the cells (i.e. one of two cells) is accomplished by reversing the connections of the primary winding of transformer T1a at the output of inverter 12. Another example of a means for providing an inverted phase output to half of the transformers is to use cell inverter transformers with the same phasing while reversing the connections to half of the cells as illustrated in FIG. 2(c). Alternatively reversing the phasing of the primary winding of half of the cell inverter transformers as shown in FIG. 2(d), rather than the secondary windings as illustrated in FIG. 2(a), provides a means for providing an inverted phase output to half of the transformers.

Figure 3B:
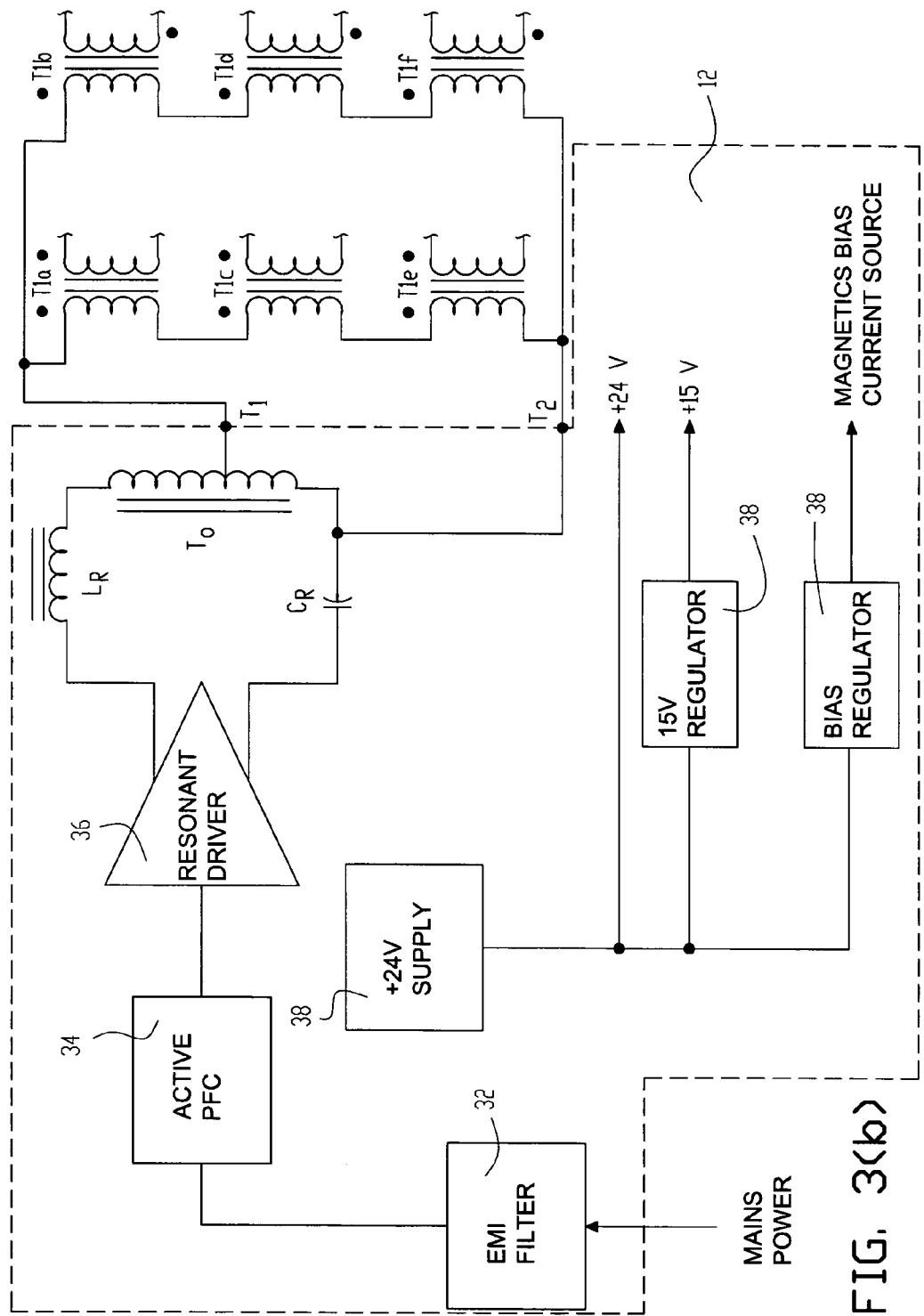
FIG. 3(b) is a simplified block and schematic diagram of another example of an inverter and cell inverter transformers used with the pulse forming networks in the high voltage pulse generator of the present invention.

In the example of the invention shown in FIG. 3(a) the primary windings of all cell inverter transformers are connected in parallel to the output of inverter 12. FIG. 3(b) illustrates another example of the invention wherein half of the primary windings are connected in series across the output of the inverter, as are the other half of primary windings.

Once capacitors C1 and C2 are charged, the cell in FIG. 1(a) is ready to provide a high voltage output pulse. This is accomplished by closing switch S1, which causes C1 to resonantly discharge and then recharge to opposite polarity. Diode D3 prevents any further resonant cycling and the voltage across the cell becomes twice the initial charge voltage. Switch S1 may be any suitable solid state device switching device, such as an insulated gate bipolar transistor (IGBT) or a metal-oxide semiconductor field-effect transistor (MOSFET).

Figure 1B:
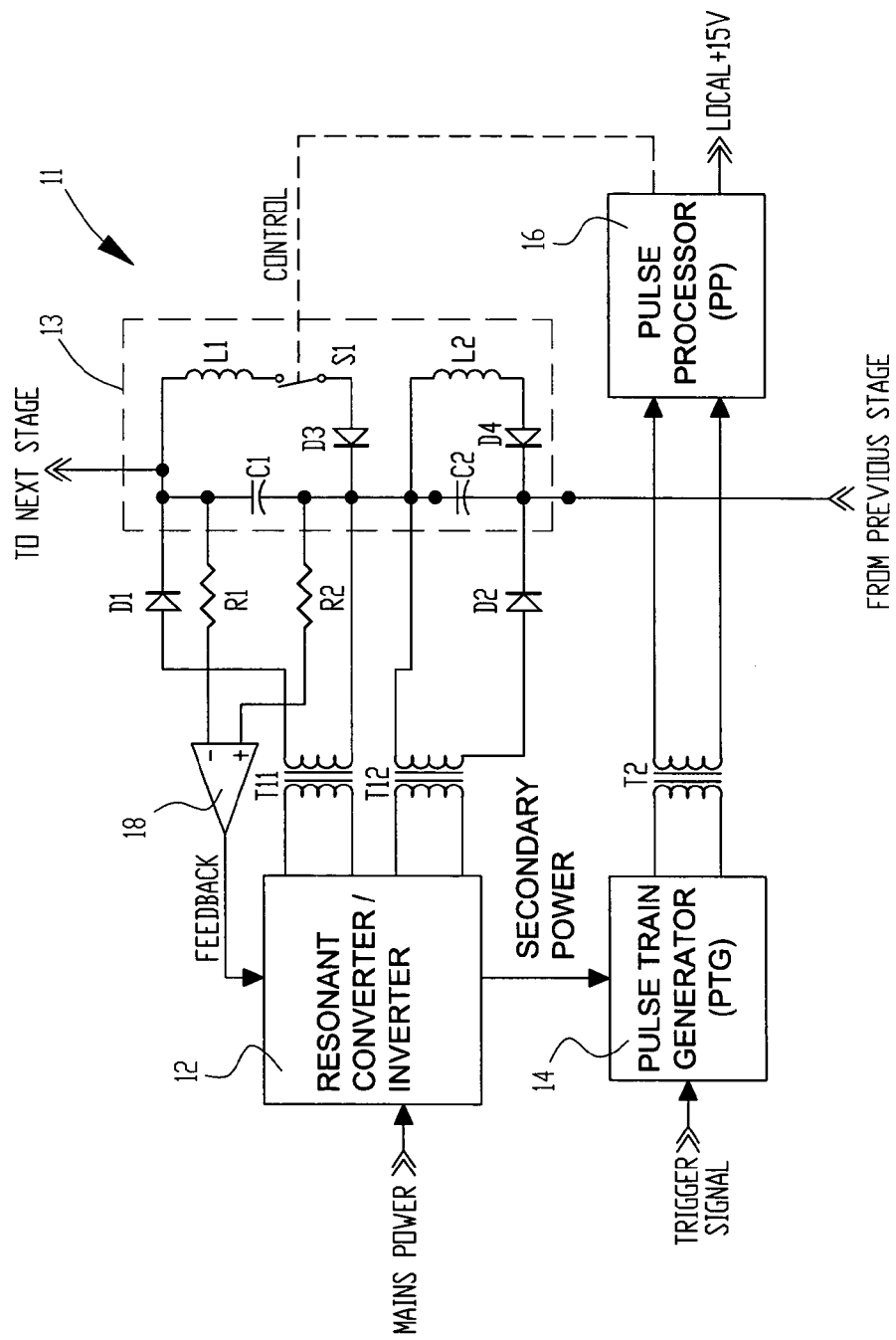
FIG. 1(b) a simplified block and schematic diagram of another example of a single-stage pulse forming network used in the high voltage pulse generator of the present invention wherein a separate inverter transformer is used to charge each capacitor in a cell.

In other examples of the invention a separate inverter transformer may be provided for each capacitor in a cell as shown in FIG. 1(b). In this particular non-limiting arrangement cell transformer T11 provides charging current for capacitor C1 and cell transformer T12 provides charging current for capacitor C2. In the event that a separate transformer is used for charging each capacitor, the inverter's output to half of all capacitors in all cells is inverted in phase from the phasing of the output to the remaining half of all capacitors in all cells. In this arrangement, all transformers associated with a particular cell may receive charging current of the same phase, or phasing may be mixed to the two or more capacitors in the same cell.

The trigger circuit for the pulse forming network used with the high voltage pulse generator of the present invention for control of switch S1 comprises pulse train generator (PTG) circuit 14 and pulse processor (PP) circuit 16 as diagrammatically shown in FIG. 1(a) and FIG. 2(a). The PTG circuit services all cells and is referenced to a local circuit ground potential. The PTG circuit is electrically isolated from the floating PP (gate drive) circuit by isolation (gate drive) transformer T2. A PP circuit and isolation transformer T2 are provided for each cell and preferably collocated with its associated Marx generator, for example, as shown in FIG. 2(a) for cell "a" wherein isolation transformer T2a and pulse processor circuit 16a are located on circuit board 30. The PTG and PP circuits work in tandem to provide opening and closing commands to switch S1, and optionally to provide local, isolated +15-volt power to drive the PP circuit. A trigger initiate circuit, as known in the art and designed for a specific application, will output a trigger initiate signal (designated "TRIGGER SIGNAL" in the figures) when a high voltage pulse is required.

Figure 4A:
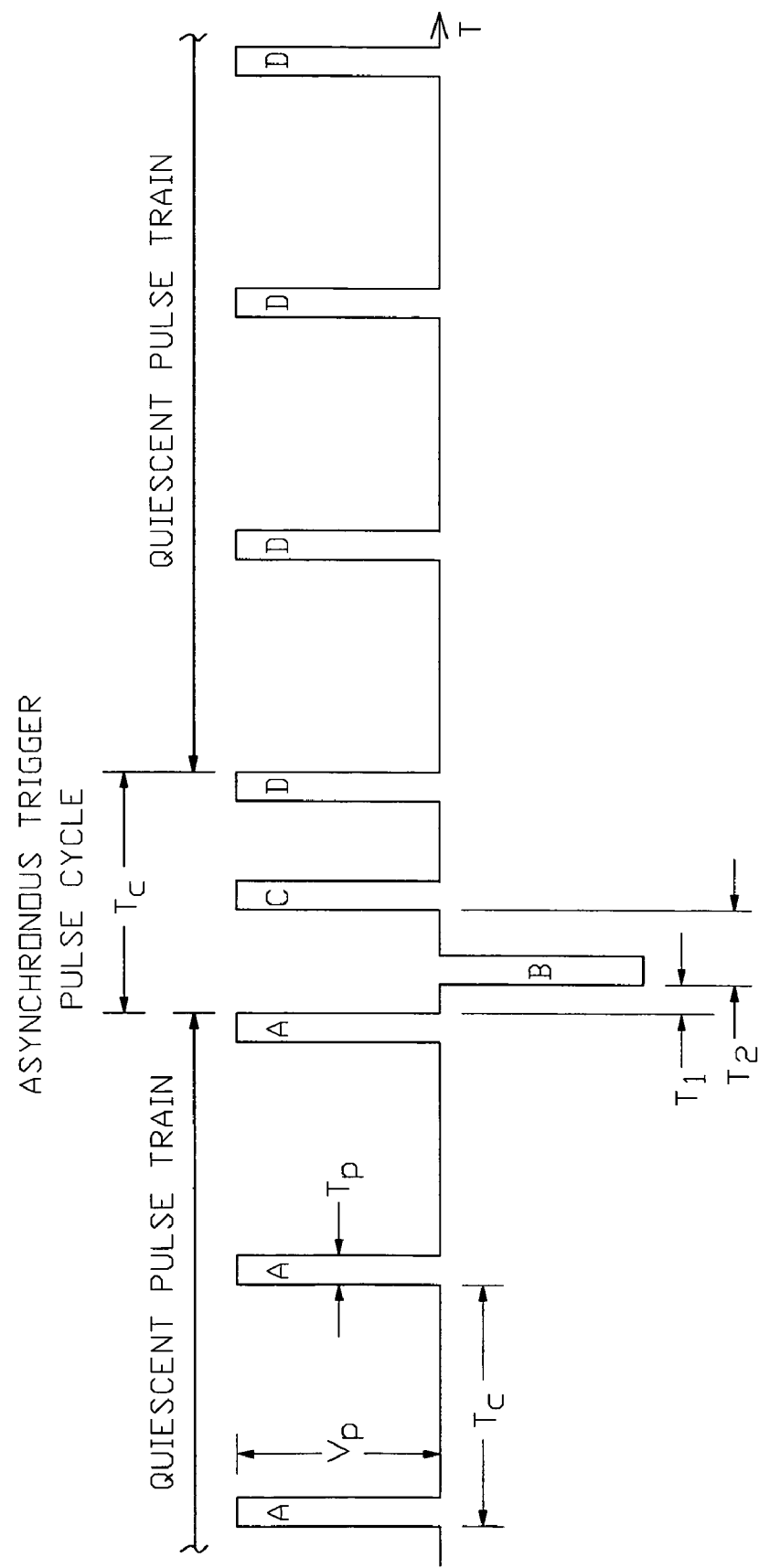
FIG. 4(a) is one example of a pulse train generated by a pulse train generator circuit used in the high voltage pulse generator of the present invention.

The principle of the gate drive utilized in the PP circuit is depicted in the timing diagram shown in FIG. 4(a). The quiescent condition is a stream of unipolar refresh pulses "A" that are received from the PTG circuit 14 by the PP circuit 16 wherein the pulses can be rectified and regulated to provide local secondary power for the PP circuit, as further described below. In this non-limiting example a refresh pulse has a nominal magnitude ($V_p$) of 21 volts, a nominal pulse width ($T_p$) of 500 nsec, and a period ($T_C$) of 16.6 μsec. Generally there are many refresh normal periodic pulses for one trigger event that generates a trigger pulse (negative-going "B" pulse in FIG. 4(a)). A trigger signal is received asynchronously relative to the clock that times the refresh pulses. Receipt of a trigger signal generates an opposite polarity trigger pulse "B" after an approximately 1 μsec delay in this non-limiting example of the invention. This delay gives the pulse processor time to suppress the normal refresh pulse so that an overlap does not occur. The gate drive receiver interprets this negative pulse as the start of a gate trigger and processes it accordingly to gate switch S1 ON. A one shot monostable multivibrator in the PTG circuit determines the trigger pulse width as received by the gate drive as further described below. The trailing edge of the one shot pulse generates positive-going turn-off pulse "C" in the pulse train as shown in FIG. 4(a). This is received by the gate drive circuit, which terminates the gate drive to turn switch S1 OFF. Subsequent normal periodic refresh pulses "D" in FIG. 4(a) also command the gate drive to the OFF state until the next negative going trigger pulse is received. In this non-limiting example, the rising edge of trigger pulse "B" occurs a minimum of 500 nsec ($T_1$) after the trailing edge of last refresh pulse "A" since all pulse widths are set at 1 μsecond in this example. The rising edge of the turn-off pulse "C" occurs typically 3.5 μsec ($T_2$) after the rising edge of trigger pulse "B."

Figure 4B:
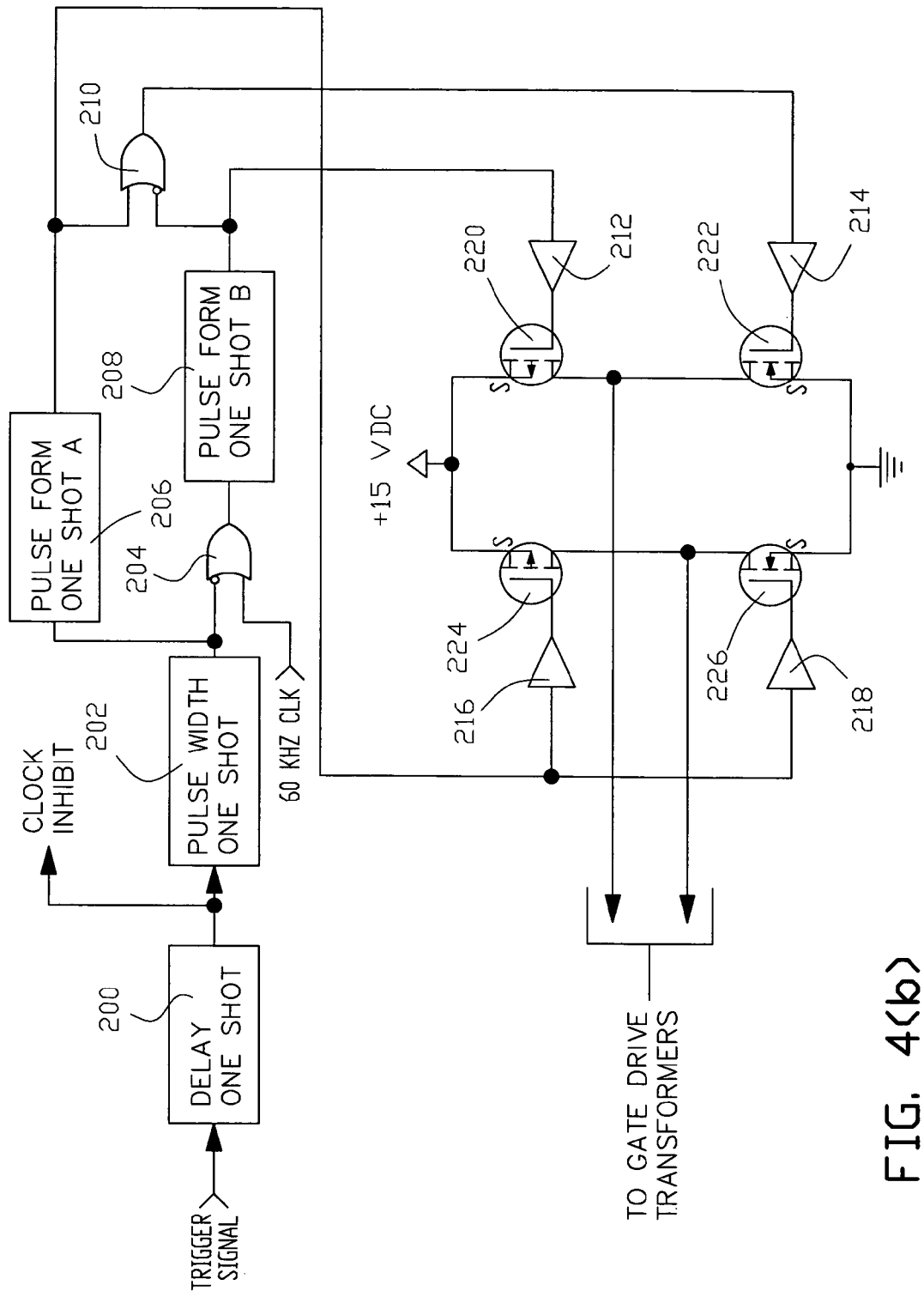
FIG. 4(b) is a simplified block and schematic diagram of one example of a pulse train generator circuit used to generate the pulse train shown in FIG. 4(a).

FIG. 4(b) is a simplified diagrammatic and schematic representation of a typical, but non-limiting, PTG circuit used in the present invention. Pulses in this example are based on use of a 60 kiloHertz clock and are generated by appropriate gating of switches (e.g. transistors) 220, 222, 224 and 226 in a H-bridge configuration. Normal refresh pulses are generated by "60 KHZ CLK" clock input to OR gate 204. An incoming trigger signal (designated "TRIGGER SIGNAL" in FIG. 4(b)) triggers delay (1 μsec in this example) monostable multivibrator (one shot) 200. A clock inhibit signal (designated "CLOCK INHIBIT") is immediately generated to suppress normal refresh pulses. After the one shot 200 delay period, pulse width one shot 202 is triggered, and its output is processed by OR gates 204 and 210, and amplified buffers 212, 214, 216 and 218 to appropriately gate the switches in the H-bridge to produce negative-going trigger pulse "B" in FIG. 4(a). One shots 206 and 208 set the width (500 nsec in this example) of the pulses in the pulse train. Although field effect transistors are illustrated as the switches in the H-bridge in FIG. 4(b) for this non-limiting example of the invention, the switches may be any other suitable type of solid state switching devices.

Figure 5:
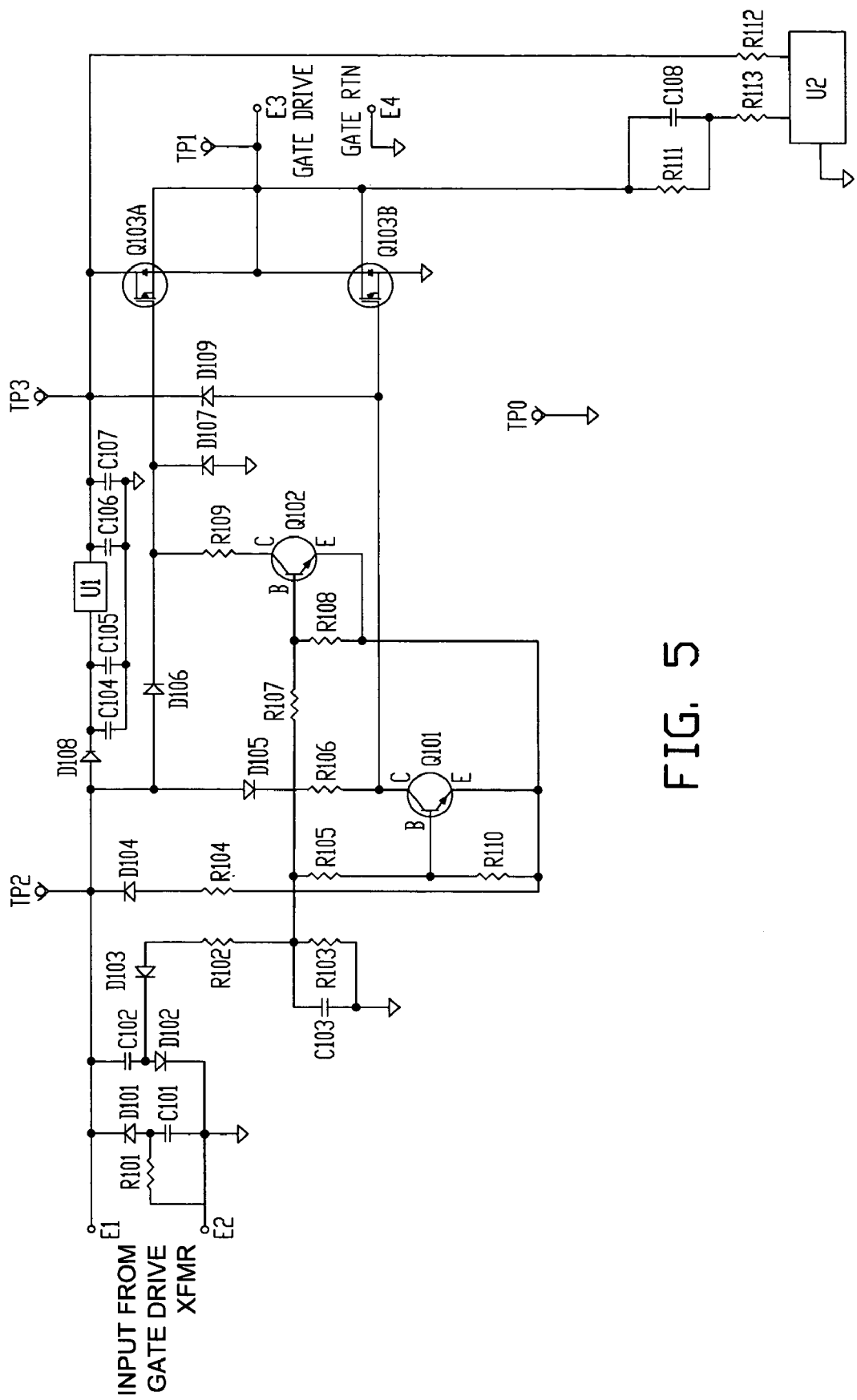
FIG. 5 is a schematic diagram of one example of a pulse processor circuit used in the high voltage pulse generator of the present invention.

FIG. 5 is a typical, but non-limiting, schematic representation of a PP circuit used in the present invention. The input pulse train from the PTG 14 via the gate drive transformer is referenced to a local floating ground and will be present at terminal point TP2. Phasing in this example of the invention is such that the normal refresh pulses are positive-going, as shown in FIG. 4(a). Local power is provided for the PP circuit by rectifying the input pulses via diode D108 and filtering the resultant dc via capacitors C104 and C105. In this particular example of the invention diode D108 is a Schottky diode. The filtered dc can be regulated to a suitable level, such as +15 volts, by using voltage regulator U1, and further filtered via capacitors C106 and C107. Under normal refresh conditions diodes D105 and D106 are periodically forward biased and provide pulses to the gates of gate drive output switches (e.g. transistors) Q103A and Q103B respectively. Gate-source capacitance holds the peak charge until the next refresh cycle to keep theses two transistors in the state established by the pulses when diode D105 and D106 are not forward biased. Diode D109 controls the maximum gate-source voltage of transistor Q103B to be within specified values. Under these conditions P-channel transistor Q103A will be held OFF and N-channel transistor Q103B will be held ON. The resultant gate drive output at terminal point TP1 will be zero volts. A trigger event results in a negative-going trigger pulse at terminal point TP2. This forward biases diode D104 and drags the emitters of transistors Q101 and Q102 negative. In this non-limiting example of the invention transistors Q101 and Q102 are operated in the grounded-base mode. An auxiliary circuit comprised of capacitor C102, diode D102, resistor R102, capacitor C103 and resistor R103 provide a negative 4-volt reference for transistors Q101 and Q102. Any trigger signal on the emitter of transistor Q101 or Q102 must exceed minus 4 volts in order to turn these transistors ON, thus providing excellent noise immunity. When transistor Q101 turns ON, the gate of transistor Q103B is pulled negative, which turns transistor Q103B OFF. At the same time the turn-on of transistor Q102 brings down the gate of transistor Q103A, which turns transistor Q103A ON. Diode D107 clamps the gate of transistor Q103A at ground, thereby keeping the gate voltage within specified limits. Resistor R109 is included to provide a slight delay between the turn off of transistor Q103B and the turn on of transistor Q103A, thereby preventing shunt spiking or shoot through. On the next part of the cycle, wherein transistor Q103B is turned ON and transistor Q103A OFF by receipt of positive-going pulse "C" in FIG. 4(a) by the gate drive circuit, resistor R106 performs the opposite delay function for shunt spike suppression. Diode D101, resistor R101 and capacitor C101 form a snubber to prevent the trailing edge of the negative-going trigger initialization pulse from prematurely ending the output trigger. Optionally a fiber-optic transmitter U2 and associated components, resistors R111, R112 and R113, and capacitor C108, make up a fiber-optic transmitter for monitoring the floating gate drive. Used with an appropriate receiver, fairly high fidelity analog resolution is achieved, and with bandwidth well within the needs of accurate circuit monitoring.

Figure 6:
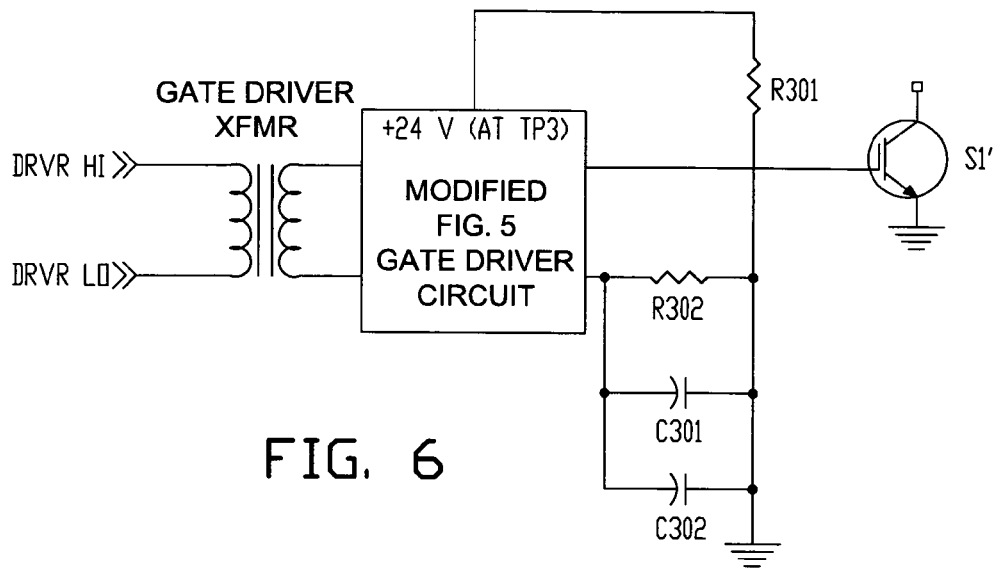
FIG. 6 illustrates a modified pulse processor circuit of the present invention that can be used to provide a bipolar gate-drive output.

The PP circuit of FIG. 5 can be modified to provide a bipolar gate drive output. For example, higher voltages may be provided by making the pulse drive input to the gate drive circuit more energetic. This can be accomplished, for example, by operating the H-bridge in FIG. 4(b) with a +24 volts dc supply instead of the +15 volts dc supply of the present example. Correspondingly, in the gate drive circuit, voltage regulator U1 could be changed to a 24-volt regulator. Taking the gate return (E4 GATE RTN in FIG. 5) to a filtered divider configured to provide a minus 4 volts in reference to local ground (instead of local ground), and completely isolating the local ground depicted in FIG. 5 from all other grounds, the driven gate device, which can be, for example, an IGBT or MOSFET device, will experience a gate drive of +20V/−4V as illustrated by the modified circuit in FIG. 6.

Returning to the basic cell schematic of FIG. 1(a), the circuit comprising inductor L2 and diode D4 provides energy recovery. When the load to which the output of the pulse generator is connected is a laser, a significant amount of energy can be reflected back to each cell circuit. This reverse pulse is of opposite polarity to the outgoing one. As a result, capacitors C1 and C2 are very rapidly charged to an opposite polarity. For capacitor C1, this polarity is the same as for the pre-trigger condition, so it ends the cycle with a partial charge of the correct polarity for the next cycle. Capacitor C2, however, is charged in a reverse direction to that it was charged to prior to the trigger. This forward biases diode D4 and a resonant L-C ring occurs. Diode D4 subsequently blocks the ringing action and leaves capacitor C2 with residual recovered energy at the correct polarity for the next cycle.

Voltage sensing resistors R1 and R2 in each cell provide voltage samples so that an error amplifier can generate a feedback signal controlling the resonant inverter via, for example, operational amplifier 18 in FIG. 1(a). As illustrated in FIG. 2(a) each cell has this arrangement, with resistor R1 in all cells tied together (R1a and R1b in FIG. 2(a)) and resistor R2 in all cells tied together (R2a and R2b in FIG. 2(a)) to form a bus structure. In this non-limiting example of the invention resistors R1 and R2 are rated at 5 Megohms. This bus provides an analog feedback signal representative of the average value of capacitor C1 and capacitor C2 voltages in all utilized cells. Since the pulse output is proportional to this average value, this summing structure allows precise control of the output pulse voltage amplitude. Individual variations in charge voltage on any capacitor C1 or capacitor C2 are averaged with capacitor C1 and capacitor C2 in all utilized cells.

Figure 7:
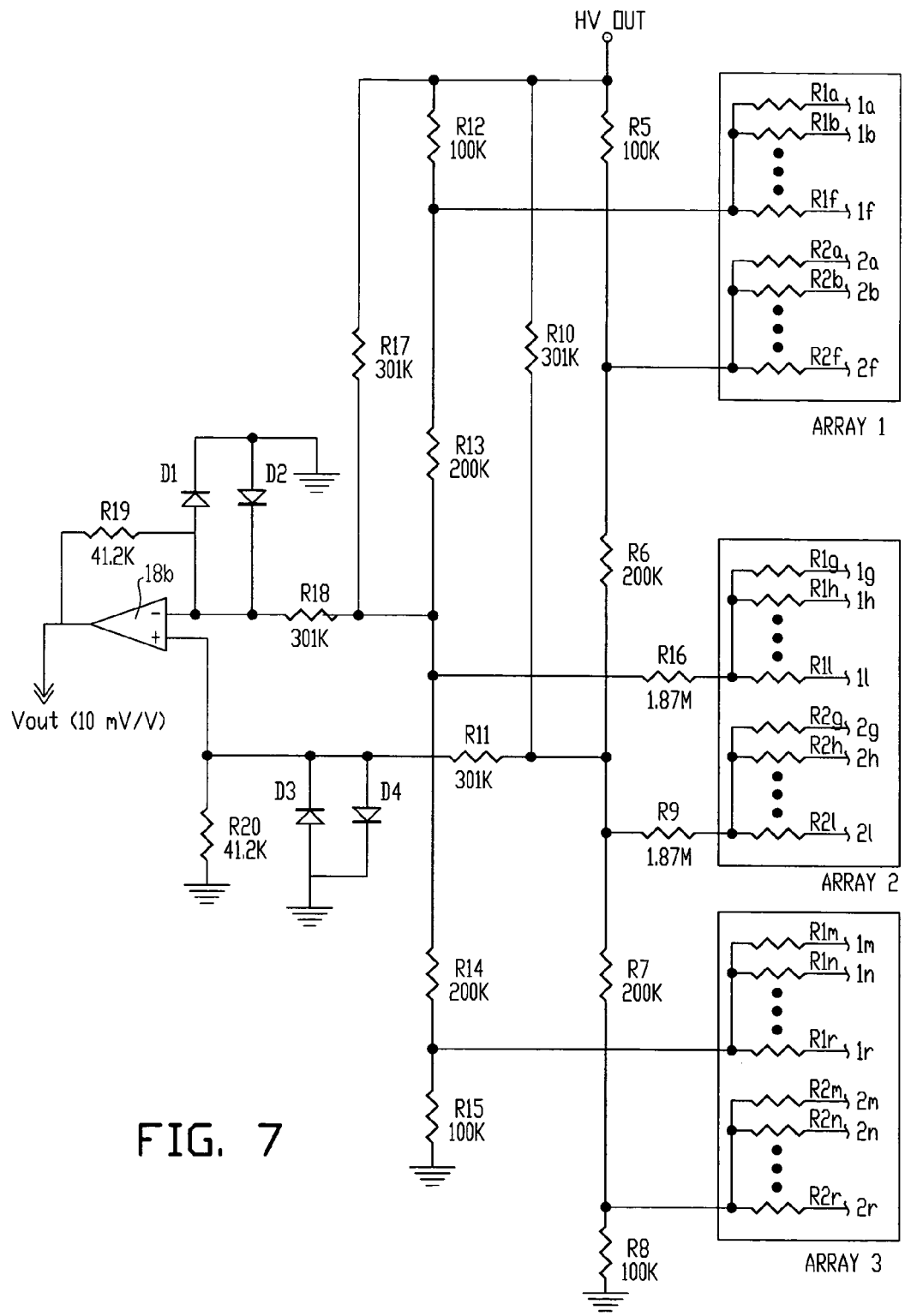
FIG. 7 illustrates an alternative summing circuit for voltage sensing across the capacitors used in the pulse forming networks of the present invention.

FIG. 7 illustrates an alternative voltage summing circuit. The example in FIG. 7 comprises an 18-stage (cell) configuration. Further the 18 cells are separated into three arrays (ARRAY 1, 2 and 3 in the figure). With an initial charge voltage of 900 volts, the total stack of 18-cells would produce a peak output pulse of 32 kV ("HV OUT" in the figure). In this example of the invention resistors R1 and R2 for each cell, instead of begin connected to inputs of operational amplifier 18 as shown in FIG. 1(a) and FIG. 2(a), are connected together in each array as shown in FIG. 7. That is, for ARRAY 1, R1 for cells 1 through 6 (R1a through R1f) are connected together at one end, and R2 for cells 1 through 6 (R2a through R2f) are connected together at one end. Resistors R1 and R2 in the cells comprising ARRAYS 2 and 3 are similarly connected. All R1 and R2 resistors are 5 Megohms in this example. The common connections in each array for resistors R1 and R2 are connected to the circuit shown in FIG. 7 and then inputted to operational amplifier 18b to provide a 10 mV/V feedback signal to resonant inverter 12. The summing network of FIG. 7 divides the peak output pulse so that any one of all sensing resistors R1 and R2 is subjected to only about 5 kV during the pulse. This greatly reduces the size of the sensing network, while lowering overall cost.

One potential disadvantage to the integrated topology of the high voltage pulse generator of the present invention is that the high voltage output pulse can be fed back to the inverter circuitry. This would absorb energy intended for the output or, worse, cause component damage. Indeed, following inversion, diode D1 of FIG. 1(a) becomes forward biased, setting up capacitor C1 to discharge through cell transformer T1. The leakage inductance of transformer T1 prevents this from occurring. Using practical circuit values, the charge loss from C1 is no more than one percent and therefore negligible. Preferably transformer T1 is designed physically larger than it needs to be solely for power-handling considerations. This allows the primary and secondary to be widely separated, so that partial discharge (corona) is suppressed. The side result of this separation is that the leakage inductance is larger than if the transformer had been configured conventionally, driven only by power-handling requirements. The cell inverter transformer T1 must be able to function with relatively high leakage inductance. Generally, the leakage inductance is significant, but still considerably smaller than the lumped element resonating inductance included in conventional inverter circuitry ($L_R$ in FIG. 3). The circuit design takes all inductances into account to achieve the intended operating parameters.

The L-C inversion time of a cell is set to the desired value by the appropriate selection of L1 in FIG. 1(a). A fundamental system tradeoff is that long inversion times mean that semiconductor components diode D3 and switch S1 are subjected to lower stress, while short inversion times reduce requirements and cost for the downstream power modulator. Generally, size and expense of the magnetics favor pushing the semiconductor-based circuit to its practical limit. This limit is primarily determined by the voltage holdoff and current-handling capability of switch S1 (typically an IGBT or IGBT array), but the performance of diode D3 comes into play, as well. The main issue with diode D3 is that it has a finite reverse-recovery time. At the end of the inversion cycle, diode D3 should snap off at the instant in time when zero current is flowing in the loop formed by inductor L1, switch S1, diode D3 and capacitor C1. But the imperfect diode D3 does not turn off until there is some reverse current flowing in L1. Then it snaps off, and a large transient voltage is developed across inductor L1. Switch S1 is still ON, and consequently, diode D3 gets the brunt of this transient. One solution to this problem is to place a saturating inductor in series with diode D3 to function as a "magnetic diode." During the normal inversion cycle, the current saturates the core in one direction. When the current attempts to reverse, the magnetic core is driven out of saturation and becomes a high impedance long enough for diode D3 to recover. This combination of magnetic and semiconductor diodes in series prevents any significant reverse current flowing in inductor L1, so no high transient across inductor L1 is generated.

Figure 8:
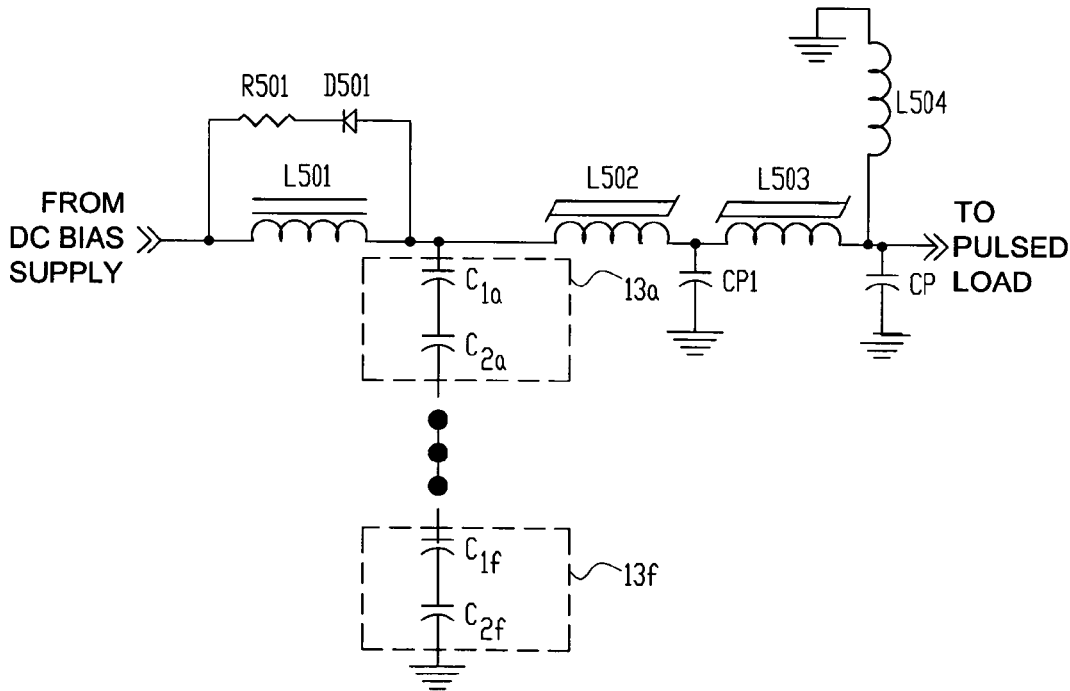
FIG. 8 is a simplified schematic diagram of a high voltage pulse generator of the present invention utilizing magnetic pulse compression.
Figure 9:
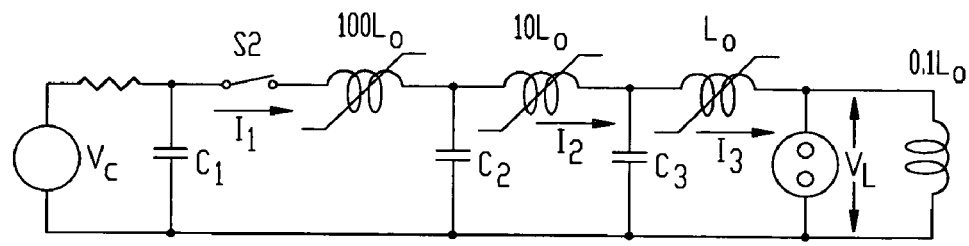
FIG. 9 is a schematic illustrating a general form of transformerless, equal-capacitance magnetic pulse compression.
Figure 10:
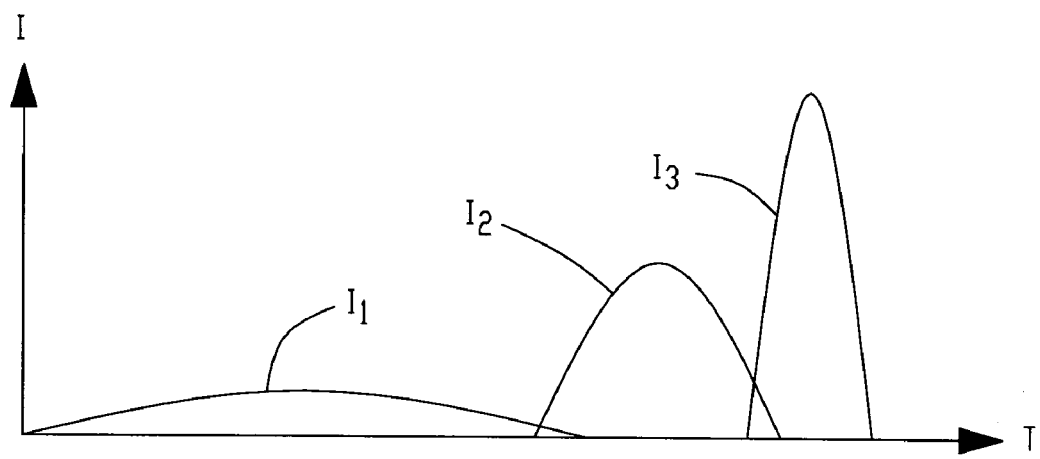
FIG. 10 is a diagram illustrating voltage and current parameters achieved with the magnetic pulse compression circuit shown in FIG. 9.
Figure 10:
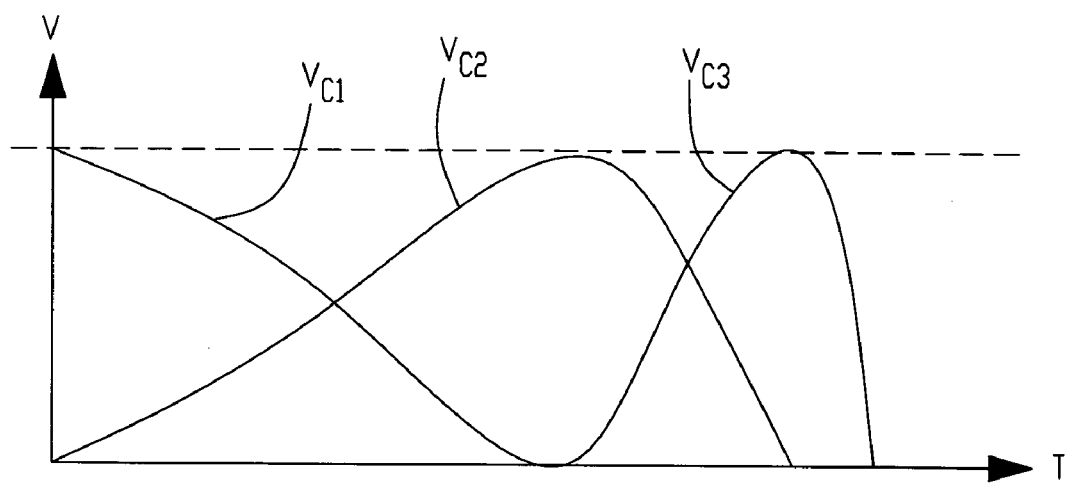

FIG. 8 is a simplified schematic of a two-stage magnetic pulse compression circuit used with the pulse forming network described above to form one example of the high voltage pulse generator of the present invention. Other examples of the invention may use different forms of power modulators. The basic principle behind magnetic pulse compression is that the inductance of a saturable reactor is much smaller when the magnetic core material saturates than prior to saturation. This phenomenon may be used in a variety of circuit topologies but in the present non-limiting example of the invention is limited to the transformerless, equal-capacitance Melville line as schematically shown in FIG. 9 for a three-stage line. In the figure, inductor $L_0$ has an inductance of $L_0$; inductor $100L_0$ has an inductance one hundred times the inductance of inductor $L_0$; and inductor $10L_0$ has an inductance ten times the inductance of inductor $L_0$; inductor $0.1L_0$ has an inductance one-tenth of the inductance of inductor $L_0$. The line's operation is initiated by the closure of switch S2, which suddenly applies the charge stored on capacitor C1 to the remainder of the line. Assuming equal capacitance values, the charge of capacitor C1 will propagate to capacitor C2, leaving capacitor C1 with no residual voltage. This transfer takes place in a time period $\pi(LC_e)^{1/2}$, where $C_e$ is the value of capacitors C1 and C2 in series. Once capacitor C2 is charged, the cycle repeats. The design of the next inductor, $10L_o$, is such that it remains unsaturated during the charge time of capacitor C2. Shortly following completion of charge, $10L_o$ saturates and transfers the charge to capacitor C3. This transfer time is $\sqrt{10}$ times faster than the previous cycle. The next cycle is equally faster. In this example, the ideal output to the load is a pulse 10 times faster in time than the input, and the peak power ten times greater. The resulting voltage and current waveforms for the circuit in FIG. 9 is shown in FIG. 10.

In FIG. 8 a non-limiting two-stage compression circuit is used to provide negative output pulses. The six stacked Marx cells 13a through 13f, which are directly connected to the compression circuit, will absorb and recover reflected energy from the load as previously described. For slow pulses an optional snubber circuit consisting of resistor R501 and diode D501 can be added, which provides a path for the bias current from a current source (designated "FROM DC BIAS SUPPLY" in FIG. 8) during the immediate post-pulse time that CP1 is recovering to the initial saturation state. In FIG. 8 current biasing for the first and second stage saturating magnetic reactors L502 and L503, respectively, is provided by a dc supply and bias isolation inductor L501. Inductor L504 serves as a downstream bias isolation inductor.

Although a certain number of Marx cells or stages are used above in the examples of the high voltage pulse generator of the present invention, the number of cells does not limit the invention except that an even number of cells are provided.

The examples of the invention include reference to specific electrical components. One skilled in the art may practice the invention by substituting components that are not necessarily of the same type or values but will create the desired conditions or accomplish the desired results of the invention. For example, single components may be substituted for multiple components or vice versa.

The foregoing examples do not limit the scope of the disclosed invention. The scope of the disclosed invention is further set forth in the appended claims.

The invention claimed is:

1. A high voltage pulse generator comprising:
a power supply having an ac output;
an even number of capacitor charging circuits, each of the even number of capacitor charging circuits comprising an LC inversion Marx generator having two or more capacitors and a switch to control charging and discharging of the capacitors; and
a plurality of cell inverter transformers, each of the plurality of cell inverter transformers comprising a primary winding and a secondary winding to supply ac power to each of the even number of capacitor charging circuits, each of the plurality of cell inverter transformers having its primary winding connected across the ac output of the power supply, each of the plurality of cell inverter transformers having its secondary winding connected exclusively to at least one of the two or more capacitors in one of the even number of capacitor charging circuits by a means for converting the ac power to dc power, each of the plurality of cell inverter transformers and associated means for converting the ac power to dc power comprising a circuit to supply the ac output of the power supply to the two or more capacitors in half of the even number of capacitor charging circuits with inverted phase from the ac output of the power supply to the two or more capacitors in the remaining half of the even number of capacitor charging circuits.

2. The high voltage pulse generator of claim 1 further comprising a feedback circuit for sensing the voltage across the two or more capacitors in each of the LC inversion Marx generators and for outputting a signal proportional to the sensed voltage to the power supply.

3. The high voltage pulse generator of claim 1 further comprising two or more arrays, each of the two or more arrays comprising an equal number of the LC inversion Marx generators, and a feedback circuit for sensing the summed voltages across the two or more capacitors in each of the equal number of the LC inversion Marx generators in each of the arrays and for outputting a signal proportional to the sensed voltages to the power supply.

4. A high voltage pulse generator comprising:
a power supply having an ac output;
an even number of capacitor charging circuits, each of the even number of capacitor charging circuits comprising an LC inversion Marx generator having two or more capacitors and a switch to control charging and discharging of the capacitors;
a plurality of cell inverter transformers, each of the plurality of cell inverter transformers comprising a primary winding and a secondary winding to supply ac power to each of the even number of capacitor charging circuits, each of the plurality of cell inverter transformers having its primary winding connected across the ac output of the power supply, each of the plurality of cell inverter transformers having its secondary winding connected exclusively to at least one of the two or more capacitors in one of the even number of capacitor charging circuits by a means for converting the ac power to dc power, each of the plurality of cell inverter transformers and associated means for converting the ac power to dc power comprising a circuit to supply the ac output of the power supply to the two or more capacitors in half of the even number of capacitor charging circuits with inverted phase from the ac output of the power supply to the two or more capacitors in the remaining half of the even number of capacitor charging circuits;

a pulse generating circuit for generating a train of periodic normal pulses except when a trigger event causes the pulse generating circuit to generate a trigger pulse; and a pulse processing circuit having a pulse processing circuit input for receiving the periodic normal pulses and trigger pulses from the pulse generating circuit, the pulse processing circuit generating a close switch output to close the switch in each of the LC inversion Marx generators when a trigger pulse is received.

5. The high voltage pulse generator of claim 4 wherein the pulse processing circuit further comprises a pulse processing circuit power supply having an input from the pulse processing circuit input and an output for generating the close switch output of the pulse processing circuit whereby the periodic normal pulses provide a sources of power to the pulse processing circuit power supply.

6. The high voltage pulse generator of claim 4 further comprising a feedback circuit for sensing the voltage across each of the two or more capacitors in each of the LC inversion Marx generators and for outputting a signal proportional to the sensed voltage to the resonant series inverter.

7. The high voltage pulse generator of claim 4 further comprising two or more arrays, each of the two or more arrays comprising an equal number of the LC inversion Marx generators, and a feedback circuit for sensing the summed voltages across the two or more capacitors in each of the equal number of the LC inversion Marx generators in each of the arrays and for outputting a signal proportional to the sensed voltages to the power supply.

8. The high voltage pulse generator of claim 4 further comprising a saturable reactor connected in series with the switch in at least one of the LC inversion Marx generators.

9. A high voltage pulse generator comprising:
a power supply having an ac output;
an even number of capacitor charging circuits, each of the even number of capacitor charging circuits comprising an LC inversion Marx generator having two or more capacitors and a switch to control charging and discharging of the two or more capacitors, the two or more capacitors in all capacitor charging circuits connected in series to form a stacked charging circuit;
a plurality of cell inverter transformers, each of the plurality of cell inverter transformers comprising a primary winding and a secondary winding to supply ac power to each of the even number of capacitor charging circuits, each of the plurality of cell inverter transformers having its primary winding connected across the ac output of the power supply, each of the plurality of cell inverter transformers having its secondary winding connected exclusively to at least one of the two or more capacitors in one of the even number of capacitor charging circuits by a means for converting the ac power to dc power, each of the plurality of cell inverter transformers and associated means for converting the ac power to dc power comprising a circuit to supply the ac output of the power supply to the two or more capacitors in half of the even number of capacitor charging circuits with inverted phase from the ac output of the power supply to the two or more capacitors in the remaining half of the even number of capacitor charging circuits;

a pulse generating circuit for generating a train of periodic normal pulses except when a trigger event causes the pulse generating circuit to generate a trigger pulse;

a pulse processing circuit having a pulse processing circuit input for receiving the periodic normal pulses and trigger pulses from the pulse generating circuit, the pulse processing circuit generating a close switch output to close the switch in each of the LC inversion Marx generators when a trigger pulse is received; and a power modulator having an output connected to a pulsed load, the stacked charging circuit connected directly to the power modulator to provide a high voltage pulse to the pulsed load.

10. The high voltage pulse generator of claim 9 wherein the power modulator comprises a magnetic pulse compression circuit.

11. The high voltage pulse generator of claim 9 wherein the pulse processing circuit further comprises a pulse processing circuit power supply having an input from the pulse processing circuit input and an output for generating the close switch output of the pulse processing circuit whereby the periodic normal pulses provide a source of power to the pulse processing circuit power supply.

12. The high voltage pulse generator of claim 9 further comprising a feedback circuit for sensing the voltage across each of the two or more capacitors in each of the LC inversion Marx generators and for outputting a signal proportional to the sensed voltage to the power supply.

13. The high voltage pulse generator of claim 9 comprising two or more arrays, each of the two or more arrays comprising an equal number of the LC inversion Marx generators, and a feedback circuit for sensing the summed voltages across the two or more capacitors in each of the equal number of the LC inversion Marx generators in each of the arrays and for outputting a signal proportional to the sensed voltages to the power supply.

14. The high voltage pulse generator of claim 9 further comprising a saturable reactor connected in series with the switch in at least one of the LC inversion Marx generators.

15. A method of generating a high voltage pulse comprising the steps of:
connecting the primary winding of each of a plurality of cell inverter transformers to the ac output of a power supply;
connecting the seconding winding of each of the plurality of cell inverter transformers to a rectifier means to convert the ac output of the power supply into dc power; and
connecting each of the rectifier means to at least one of the capacitors in each of an even number of LC inversion Marx generators to provide a means for charging the capacitors, each of the even number of LC inversion Marx generators having a switch to control charging and discharging of the capacitors, half of the plurality of cell inverter transformers having their primary windings arranged in inverted phase to the ac output of the power supply from the remaining plurality of cell inverter transformers to charge the capacitors in half of the even number of LC inversion Marx generators in each half cycle of the ac output of the power supply.

16. The method of claim 15 further comprising the steps of sensing the voltage across each of the capacitors in the even number of LC inversion Marx generators, and inputting to the power supply a signal proportional to the sensed voltage across each of the capacitors.

17. The method of claim 15 further comprising the steps of dividing the even number of LC inversion Marx generators into two or more arrays, each of the two or more arrays having an equal number of the LC inversion Marx generators; sensing the summed voltages across each of the capacitors in the equal number of the LC inversion Marx generators in each of the arrays; and inputting to the power supply a signal proportional to the sensed summed voltages.

18. The method of claim 15 further comprising the steps of generating a train of periodic normal pulses except when a trigger event occurs, and generating a trigger pulse when the trigger event occurs.

19. The method of claim 18 further comprising the step of closing the switch in each of the even number of LC inversion Marx generators when the trigger pulse is generated.

20. The method of claim 19 further comprising the step of using the train of periodic normal pulses to supply power for closing the switch in each of the even number of LC inversion Marx generators when the trigger pulse is generated.

21. The method of claim 15 further comprising the step of inserting a saturable reactor in series with the switch in at least one of the even number of LC inversion Marx generators.

22. The method of claim 19 further comprising the steps of stacking the even number of LC inversion Marx generators so that the capacitors in the even number of LC inversion Marx generators are connected in series, and connecting the series connected capacitors directly to a power modulator to supply a high voltage pulse to a pulsed load.

* * * * *